UNITED STATES PATENT OFFICE.

CHARLES CLIFTON MOORE AND WILLIAM TRANTOM, OF LYMM, ENGLAND.

METHOD OF TREATING HIDES BEFORE TANNING.

1,091,236.

No Drawing.

Specification of Letters Patent. Patented Mar. 24, 1914.

Application filed November 25, 1913. Serial No. 803,025.

*To all whom it may concern:*

Be it known that we, CHARLES CLIFTON MOORE and WILLIAM TRANTOM, subjects of the King of Great Britain, residing at Lymm, in the county of Chester, in the Kingdom of England, have invented certain new and useful Improvements in the Method of Treating Hides Before Tanning, of which the following is a specification.

The object of the present invention is an improved process for the treatment of hides immediately after removal from the carcass and before tanning in order to prevent decomposition and consequent loss of hide substance. Such hides are frequently sprinkled with commercial sodium chlorid and it is found that stains are frequently produced after such treatment. Moreover it is known that when the salt is subsequently washed out, a certain loss of hide substance takes place. Some experimenters have endeavored to prevent the formation of salt stains by the addition of an antiseptic such as zinc chlorid or mustard oil since these stains were considered to be due to the action of bacteria, though certain observers suggested that they arose from the hemoglobin of the blood. Others have suggested the addition of borax which apparently prevents stains but causes a slight general blue coloration of the whole mass. Where borax or more powerful antiseptics, such as sodium fluorid, mustard oil, etc., are employed however there is still the loss in hide substance when the salt is washed out.

It is the object of the present invention to devise a process which shall overcome all these disadvantages and more particularly to prevent the formation of salt stains and to diminish the loss in hide substance.

It need scarcely be pointed out that if it is possible to prevent a loss of from 2 to 4% of hide substance, the process would be of great commercial importance since it would yield an actually greater weight of better product. We have accordingly made extensive experiments during both winter and summer months with large quantities of hides and we have succeeded in elucidating the causes which underlie both the above mentioned phenomena. We will discuss this matter more fully later but we may say here that we have discovered that staining can be prevented if bacteriological decomposition is inhibited simply by the exclusion of water and salts containing water of crystallization instead of by the addition of antiseptics. It is well known that ordinary commercial salt contains considerable quantities of such salts especially sodium sulfate and certain calcium and magnesium compounds. Secondly we have found that the loss in weight of hide substance can be diminished by excluding salts containing water of crystallization and calcium and magnesium compounds. Sulfate of sodium in particular causes the liberation of free sulfuric acid in the hide substance which is an amphoteric colloid. It has been shown by the researches of Lloyd and others that amphoteric bodies in general are extremely liable to undergo what are termed "neutral salt reactions" whereby compounds of the amphoteric substance are formed with the acid or basic ions of the neutral salt. In the present case we have found that sodium sulfate forms a very soluble alkali hide substance which causes the loss in weight. In addition to the above two points we have found that if, instead of adding antiseptics, we simply exclude the above mentioned impurities, we further improve the appearance of the leather very considerably apart from the salt stains. We have found that this improvement is due to the avoidance of the formation of difficultly soluble calcium and magnesium compounds with the albuminoid matter of the hide colloid and also to the avoidance of the formation of insoluble soaps with the fatty matter contained in and adhering to the hide. According to our invention therefore we remove substantially all the impurities from commercial common salt preferably by the process disclosed in the specification of British Patent No. 23642/02, granted to us which succeeds in producing a product containing 99.99% of sodium chlorid. We then treat the hide immediately after removal from the carcass with about 15 to 20% by weight of such chemically pure salt in the dry and very finely divided form. The salt in this condition is readily taken up by the hide. The weight of an ordinary hide is about 60 to 65 lbs. and the quantity of chemically pure salt to be used for a hide of this weight is about 10 to 12 lbs. The hide as removed from the carcass is spread out on the floor with the hair side down and the quantity of chemically pure salt mentioned is sprinkled evenly over the flesh side of the hide. The salt is dissolved in the natural moisture of the hide and being perfectly pure, no impurities or water, either mechanically or chemically combined are introduced into the hide. The result of this treatment is that bacteriological decomposition is immediately stopped or suspended for an indefinite period, thereby keeping the hide in a perfectly fresh condition without decomposition or appreciable loss of hide substance. With this method of treatment the hide can be kept indefinitely. When the hide is to be tanned it is thoroughly washed with pure water but it is not necessary that this washing should remove all the salt, as is the case when impure salt is used, as, even if a small quantity of the chemically pure sodium chlorid is left in the hide substance, it will not enter into any objectionable chemical reaction or exert any prejudicial effect upon the subsequent tanning process. After undergoing this process of treatment with chemically pure sodium chlorid the hide is left in a very active form and we find that it is rendered more capable of reacting with the tanning material.

We may sum up our process by saying that in so far as the salt stains are concerned, we treat the hides aseptically as compared to the processes using mustard oil or zinc chlorid which are antiseptic or the process using commercial common salt which is septic, since in this latter case considerable quantities of water are introduced into the hide setting up bacteriological decomposition. Moreover owing to the absence of hygroscopic impurities especially magnesium chlorid we are enabled to avoid the addition of water since sodium chlorid itself contains no water of crystallization. By the exclusion of the mineral impurities and also of water, we further find that it is possible to save from 2 to 4% by weight of hide substance.

We declare that what we claim is:—

1. The process of preserving hides before tanning which comprises treating said hides after removal from the carcass with chemically pure sodium chlorid.

2. The process of preserving hides before tanning which comprises treating said hides after removal from the carcass with very finely divided chemically pure sodium chlorid.

3. The process of preserving hides before tanning which comprises treating said hides after removal from the carcass with dry chemically pure sodium chlorid.

4. The process of preserving hides before tanning which comprises treating said hides after removal from the carcass with sodium chlorid substantially free from calcium and magnesium salts and salts containing water of crystallization.

In witness whereof, we have hereunto signed our names this 15 day of Novr. 1913, in the presence of two subscribing witnesses.

CHARLES CLIFTON MOORE.
WM. TRANTOM.

Witnesses:
HAROLD EDWIN POTTS,
RICHARD MERCER.